United States Patent
Inada

(10) Patent No.: US 8,359,483 B2
(45) Date of Patent: Jan. 22, 2013

(54) COMMUNICATION DEVICE THAT ENTERS ACTIVE MODE WHEN UPDATED FEED IS ACQUIRED

(75) Inventor: Hajime Inada, Chiryu (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 500 days.

(21) Appl. No.: 12/570,693

(22) Filed: Sep. 30, 2009

(65) Prior Publication Data

US 2010/0083016 A1    Apr. 1, 2010

(30) Foreign Application Priority Data

Sep. 30, 2008   (JP) .................................. 2008-254501

(51) Int. Cl.
    *G06F 1/32*    (2006.01)
(52) U.S. Cl. ......... 713/320; 713/300; 713/323; 713/324
(58) Field of Classification Search .................. 713/300, 713/320, 323, 324
    See application file for complete search history.

(56) References Cited

U.S. PATENT DOCUMENTS

2002/0078393 A1*   6/2002  Parker .......................... 713/324
2003/0131274 A1*   7/2003  Mizuyabu et al. ............ 713/324
2008/0165209 A1    7/2008  Kondo et al.
2008/0220829 A1    9/2008  Akama et al.

FOREIGN PATENT DOCUMENTS

| JP | 9-247013 | 9/1997 |
|---|---|---|
| JP | 2003-216524 | 7/2003 |
| JP | 2004-255658 | 9/2004 |
| JP | 2007-129582 | 5/2007 |
| JP | 2007-148956 | 6/2007 |
| JP | 2007-299272 | 11/2007 |
| JP | 2007-310833 | 11/2007 |
| JP | 2008165692 A | 7/2008 |
| JP | 2008-227672 | 9/2008 |

OTHER PUBLICATIONS

Japanese Office Action for Patent Application No. 2008-254501 dated Oct. 5, 2010 with English translation.

* cited by examiner

*Primary Examiner* — Paul Yanchus, III
(74) *Attorney, Agent, or Firm* — Scully, Scott, Murphy & Presser, P.C.

(57) ABSTRACT

A communication device is communicable with a server that distributes a content item and a content summary. The communication device acquires the content summary from the server at fixed intervals. When an updated content summary is acquired while a display unit of the communication device is in a sleep mode, then the display unit enters an active mode.

14 Claims, 13 Drawing Sheets

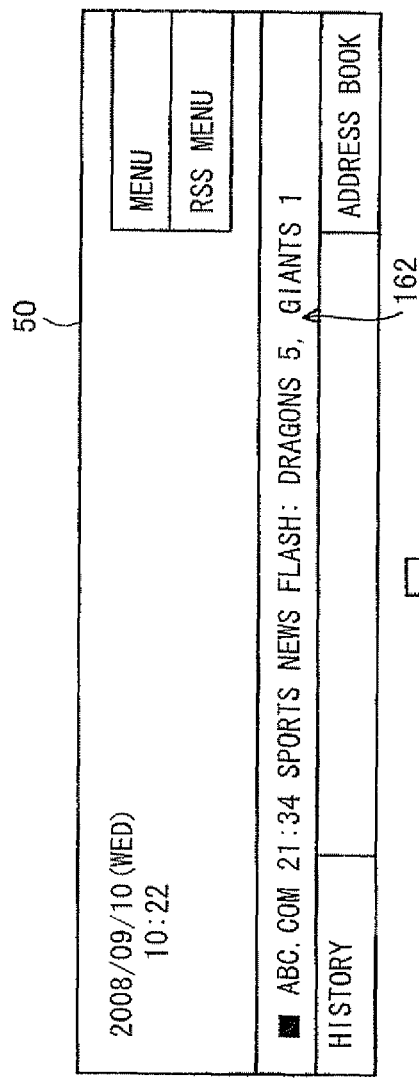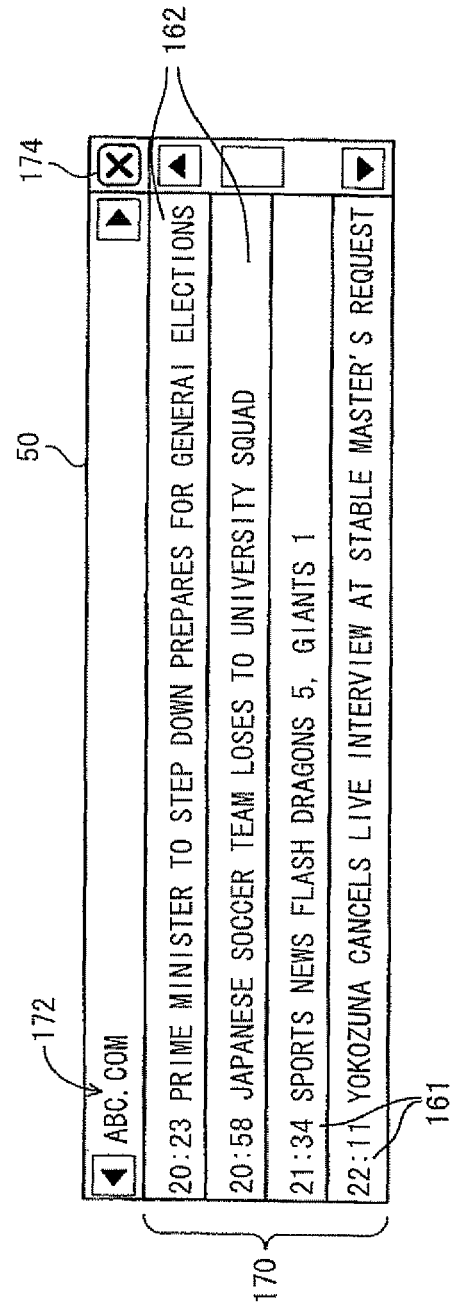

COMMUNICATION DEVICE THAT ENTERS ACTIVE MODE WHEN UPDATED FEED IS ACQUIRED

CROSS REFERENCE TO RELATED APPLICATION

This application claims priority from Japanese Patent Application No. 2008-254501 filed Sep. 30, 2008. The entire content of the priority application is incorporated herein by reference.

TECHNICAL FIELD

The present invention relates to a communication device for displaying titles of content published on a network.

BACKGROUND

Servers that distribute various content over a network are well known in the art. The servers also distribute a content summary that includes a title and uniform resource locator (URL) for each item of content. One example of the content summary is referred to as a "feed" and exists in various formats, including Resource Description Framework Site Summary (RSS) and Atom.

Devices known in the art are capable of acquiring RSS feeds (including images of articles) from a plurality of RSS servers and displaying a list of titles for the articles. When a user of the device selects one of the titles in the list, the device displays the title, body (description), and images for the article, as well as a button linking to a corresponding Web page. When the user selects the link button, the device acquires and displays data from the Web page.

One such conventional device is configured to enter a sleep mode (turn OFF a backlight of a display unit, for example) when a prescribed condition is met, e.g., when the device has not been operated for a continuous fixed interval.

SUMMARY

It is an object of the invention to provide a device that shifts from a sleep mode to an active mode when an updated feed is acquired in the sleep mode, notifying the user of the update of the feed.

In order to attain the above and other objects, the invention provides a communication device communicable with a server that distributes a content item and a content summary including a title of the content item. The communication device includes a display section, a first storing unit that stores a first location data indicating a location of the content summary, a content summary acquiring unit that acquires, based on the first location data, the content summary from the server each time a first predetermined time duration elapses, a first display unit that controls the display section to display the title included in the content summary, and a first control unit that shifts the display section from a sleep mode to an active mode when a first event is generated while the display section is in the sleep mode. The first event is reception of an updated content summary.

BRIEF DESCRIPTION OF THE DRAWINGS

The particular features and advantages of the invention as well as other objects will become apparent from the following description taken in connection with the accompanying drawings, in which:

FIG. 13 (a) is a view showing an example of display displayed on a display panel of the multifunction device; and FIG. 13(b) is a view showing another example of display displayed on the display panel.

DETAILED DESCRIPTION

Figure 1:
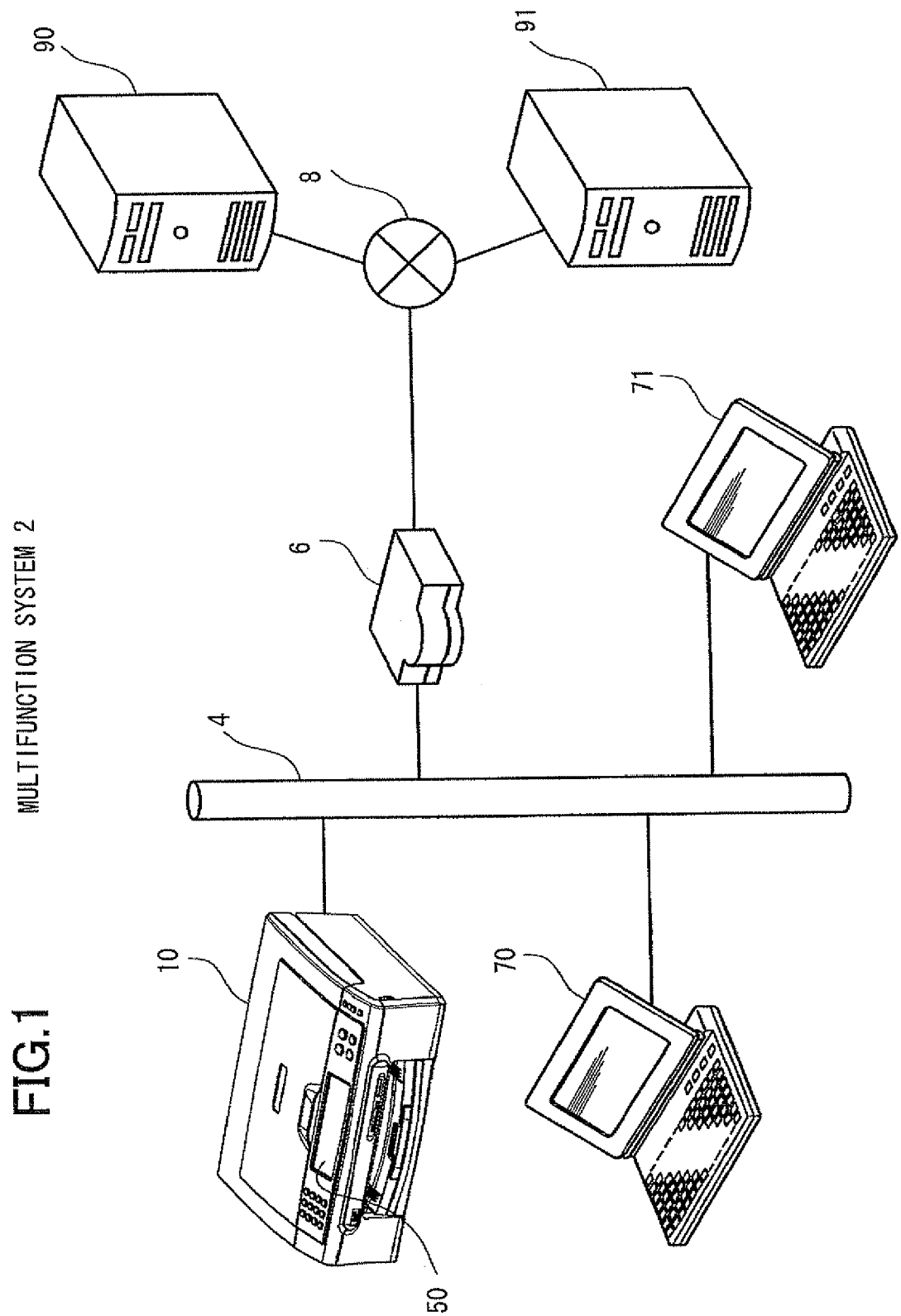
FIG. 1 is an illustrative view showing a structure of a multifunction device system according to an embodiment of the invention.

A multifunction device system according to an embodiment of the invention will be described while referring to the accompanying drawings wherein like parts and components are designated by the same reference numerals to avoid duplicating description.

As shown in FIG. 1, a multifunction device system 2 of the embodiment includes a multifunction device 10, personal computers (PCs) 70 and 71, and content providing servers 90 and 91. The multifunction device 10 and the PCs 70 and 71 are each connected to a LAN circuit 4, which is in turn connected to Internet 8 via a router 6. Each of the servers 90 and 91 is connected to the Internet 8. In the example of the embodiment, the servers 90 and 91 publish one Web site each, where each Web site includes a plurality of content items. Each of the servers 90 and 91 stores a feed in the RSS format summarizing the plurality of content items included on each Web site. The details of feeds will be described later.

Figure 2:
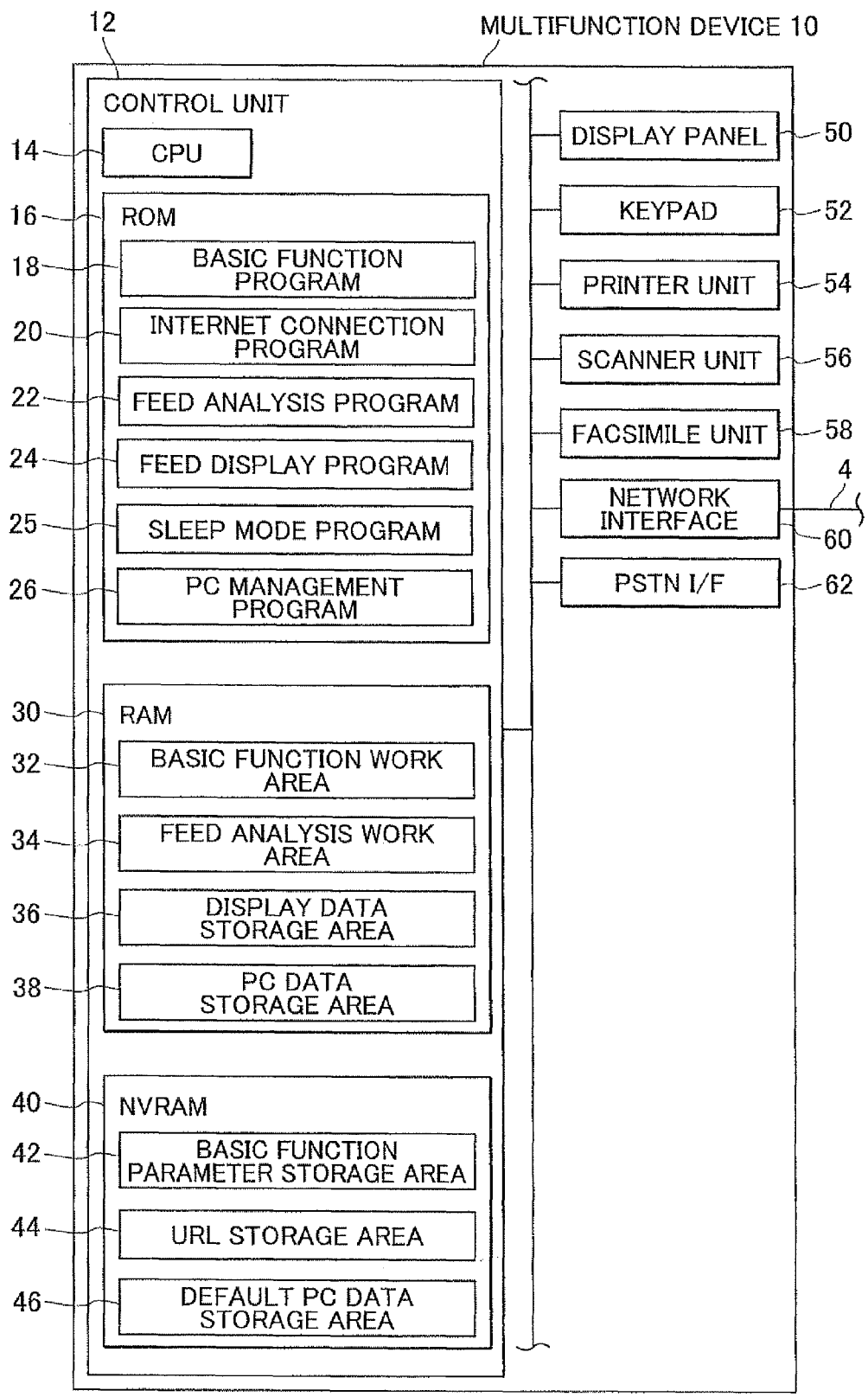
FIG. 2 is a block diagram of a multifunction device included in the multifunction device system of FIG. 1.

As shown in FIG. 2, the multifunction device 10 includes a control unit 12, a display panel 50, a keypad 52, a printer unit 54, a scanner unit 56, a facsimile unit 58, a network interface 60, a PSTN (Public Switched Telephone Network) interface 62, and the like. The control unit 12 includes a CPU 14, a ROM 16, a RAM 30, a NVRAM 40, and the like.

The ROM 16 stores various programs including a basic function program 18, an internet connection program 20, a feed analysis program 22, a feed display program 24, a sleep mode program 25, and a PC management program 26, based on which the CPU 14 performs various operations.

The basic function program 18 is a program for controlling basic functions of the multifunction device 10. The basic function program 18 includes, for example, a program for generating data to be displayed on the display panel 50 and a program for controlling the printer unit 54, the scanner unit 56, the facsimile unit 58, and the like. The internet connection program 20 is for establishing connection with the Internet 8. The feed analysis program 22 is for analyzing feeds acquired from the servers 90 and 91 and for generating display data 112 (FIG. 4) to be displayed on the display panel 50. The feed display program 24 is for displaying the display data 112. The sleep mode program 25 is for executing a sleep mode process (described later). The PC management program 26 is for executing processes in accordance with a PC activation command transmitted from the PC 70, 71.

The RAM 30 includes memory areas including a basic function work area 32, a feed analysis work area 34, a display data storage area 36, and a PC data storage area 38. The basic function work area 32 is for storing various data that is generated in the course of operations performed based on the basic function program 18. The feed analysis work area 34 is for storing various data that is generated in the course of operations performed based on the feed analysis program 22. The display data storage area 36 is for storing the display data 112 generated based on the feed analysis program 22. The PC information storage area 38 is for storing information regarding the PC 70, 71 from which the PC activation command is transmitted.

The NVRAM 40 includes various memory areas including a basic function parameter storage area 42, a URL storage area 44, and a default PC data storage area 46. The basic function parameter storage area 42 is for storing various parameters (printer settings and scanning settings, for example) to be used when the CPU 14 performs operations based on the basic function program 18. The URL storage area 44 is for storing URLs for feeds from content providing servers, such as the servers 90 and 91. The user must register for each of the servers 90 and 91 in order to receive, content therefrom, for example. This registration may be performed using the multifunction device 10 or one of the PCs 70 and 71.

The display panel 50 is for displaying various information. The display panel 50 has a display screen that is smaller than that of the PC 70, 71. The display panel 50 functions as a touch panel also. The keypad 52 includes a plurality of keys. A user can input various commands and information to the multifunction device 10 through manipulation of the keypad 52. The network interface 60 is connected to the LAN circuit 4. The multifunction device 10 is communicable with the PCs 70 and 71 and accessible to the Internet 8. The PSTN interface 62 is connected to PSTN (not shown in the drawings), which is used for facsimile communication and telephone communication.

Figure 3:
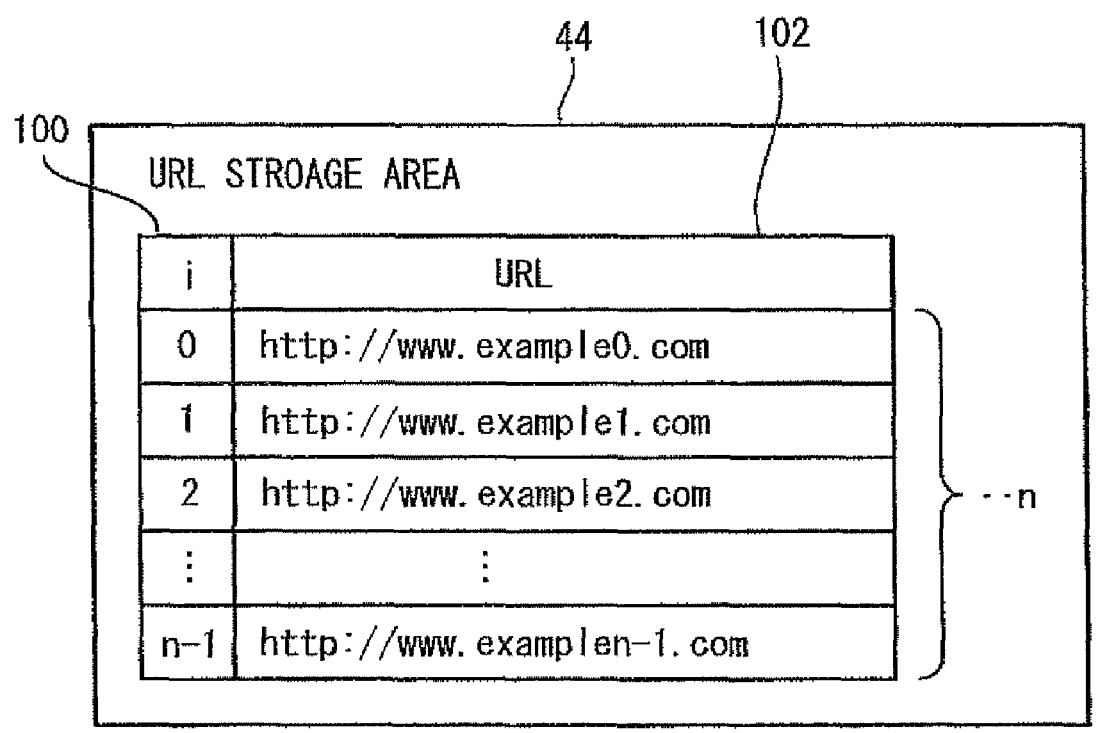
FIG. 3 is a view showing an example of a memory content of a URL storage area of the multifunction device.

Next, the content stored in the URL 44 of the NVRAM 40 will be described with reference to FIG. 3. The URL storage area 44 can store URLs 102 for feeds for the servers 90 and 91. Specifically, the URL storage area 44 can store URLs 102 for feeds for respective Web sites. In the example shown in FIG. 3, the URL storage area 44 stores n URLs 102, where n is an integer equal to or greater than 1 and is defined as a registered site number n. An ID number 100 is assigned to each URL 102. In this embodiment, a variable i is used to represent the value of the ID number 100.

Figure 4:
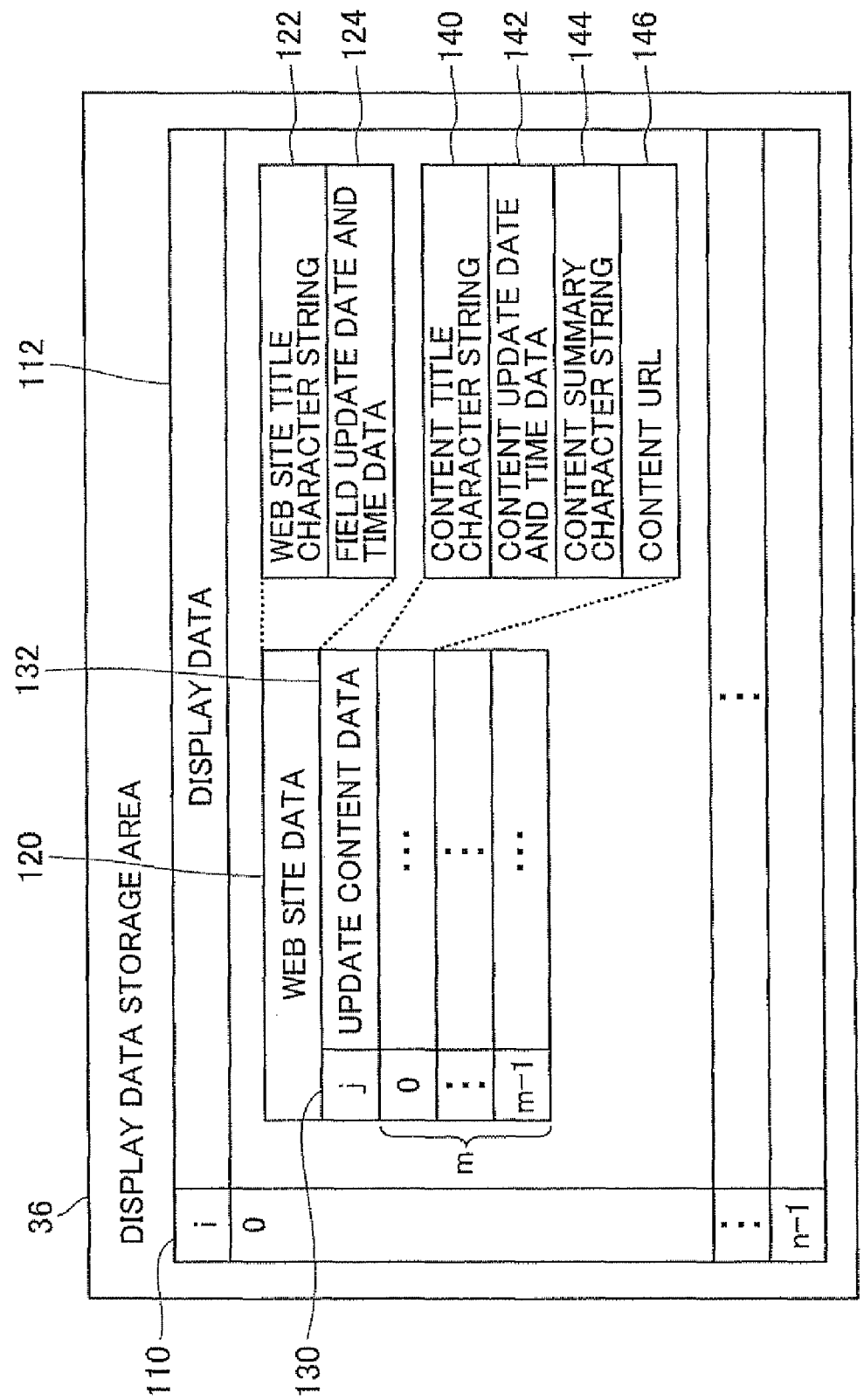
FIG. 4 is a view showing an example of a memory content of a display data storage area of the multifunction device.

Next, the content stored in the display data storage area 36 of the RAM 30 (FIG. 2) will be described with reference to FIG. 4. FIG. 4 is an explanatory diagram conceptually illustrating sample content stored in the display data storage area 36. The display data storage area 36 can store display data 112 for each URL 102 stored in the URL storage area 44. In other words, the display data storage area 36 can store display data 112 for each feed whose URL 102 is stored in the URL storage area 44. As described above, the URL storage area 44 stores n URLs 102 (FIG. 3). Accordingly, the display data storage area 36 stores n entries of display data 112. An ID number 110 is assigned to each entry of display data 112. In this embodiment, a variable i is used to represent the value of the ID number 110.

Each entry of display data 112 includes a Web site data 120 and an update content data 132. The Web site data 120 includes a Web site title character string 122 and a field update date and time data 124.

The Web site title character string 122 is an array of characters constituting the title of the Web site, which could also be referred to as the "site name." The field update date and time data 124 is data indicating the date and time that a field on the server 90 or 91 was updated (most recent update).

The number of entries of update content data 132 in the display data 112 is equivalent to the number of items of content on the Web site. For example, the display data 112 corresponding to "i=0" in FIG. 4 has m update content data 132 entries (where m is an integer equal to or greater than 1). This signifies that the Web site corresponding to "i=0" has m content items. Here, m is defined as the registered content number m. For example, if a prescribed Web site has weather-related content and sports-related content, the display data 112 associated with this Web site has two entries of update content data 132. An ID number 130 is assigned to each entry of update content data 132. In this embodiment, a variable j is used to represent the value of the ID number 130.

Each update content data 132 entry includes a content title character string 140, a content update date and time data 142, a content summary character string 144, and a content URL 146. The content title character string 140 is an array of characters constituting the title of the content, which could also be referred to as the "content name." The content update date and time data 142 is data indicating the date and time that the content on the server 90, 91 was updated (most recent update). The "title" of the content denotes a character string that is shorter than the entire text in the content and that describes the type of content. The content summary character string 144 is an excerpt of the text included in the content. In other words, the content summary character string 144 is a character string longer than the content title and shorter than the entire text in the content that reflects the general idea of the content. The content URL 146 is the URL required for accessing the content.

Next, a feed analysis process will be described with reference to the flowchart of FIG. 5. The feed analysis process is executed by the CPU 14 of the multifunction device 10 for obtaining and analyzing feeds. When the multifunction device 10 is started, the CPU 14 executes the feed analysis process as an independent task based on the internet connection program 20 and the feed analysis program 22 (FIG. 2).

In the feed analysis process, first in S48, the CPU 14 initializes the display data storage area 36. Then, in S50, the CPU 14 sequentially connects to each of n Web sites and acquires a feed from each Web site. Each feed includes the Web site data 120 and the update content data 132 shown in FIG. 4.

In S52, the CPU 14 analyzes the feeds and generates the display data 112 shown in FIG. 4. In S54, the CPU 14 compares the display data 112 generated at the previous update time (the display data 112 currently stored in the display data storage area 36) to the display data 112 generated at the current update time.

In S56, the CPU 14 determines whether the display data 112 generated previously is the same as the currently generated display data 112. That is, the CPU 14 determines whether the display data 112 (feeds) has been updated. If the previous and current display data 112 are the same (S56:YES), then the process advances to S60. On the other hand, if not (S56:NO), then in S58, the CPU 14 generates an RSS sleep reset event, and advances to S60. The RSS sleep reset event is for notifying that a feed (display data 112) has been updated. It should be noted that when there is no display data 112 stored in the display data storage area 36 as a result of the initialization in S48 at the beginning of the feed analysis process, then a negative determination is made in S56.

In S60, the CPU 14 stores the display data 112 generated in S52 in the display data storage area 36. In S62, the CPU 14 waits for a next update time to arrive. The update intervals may be either set by the user or determined by the programs, for example. When the update time arrives, the CPU 14 returns to S50 and repeats the process described above. By executing the feed analysis process in FIG. 5, the CPU 14 stores the display data 112 generated based on the latest feed for each of the n Web sites in the display data storage area 36.

Next, a display process will be described with reference to the flowcharts of FIGS. 6 and 7. The display process is executed by the CPU 14 of the multifunction device 10 for displaying the display data 112. In the display process, first in S71, the CPU 14 reads the display data 112 from the display data storage area 36. In S72, the CPU 14 acquires the registered site number n from the URL storage area 44 (FIG. 2) of the NVRAM 40. Then, in S74, the CPU 14 initializes a value of a counter i to 0. In S76, the CPU 14 determines whether or not the value of the counter i is less than the registered site number n. If so (S76:YES), then the process advances to S78.

In S78, the CPU 14 acquires the Web site data 120 included in the display data 112 of the $i^{th}$ Web site from the display data storage area 36 of the RAM 30. In the case of the $0^{th}$ Web site in FIG. 4, for example, the CPU 14 acquires the Web site data 120 (the Web site title character string 122 and the feed update date and time data 124) shown in FIG. 4.

Next in S80, the CPU 14 retrieves the registered content number m on the $i^{th}$ Web site. In S82, the CPU 14 initializes a value of a counter j to 0. In S84, the CPU 14 determines whether or not the value of the counter j is less than the registered content number m. If so (S84:YES), then the process advances to S88 of FIG. 7.

In S88, the CPU 14 acquires the $j^{th}$ update content data 132 for the $i^{th}$ Web site from the display data storage area 36 of the RAM 30, i.e., the content title character string 140, the content update date and time data 142, the content summary character string 144, and the content URL 146 for the $j^{th}$ item of content.

Next in S90, the CPU 14 transmits the Web site title character string 122 acquired in S78 and the content title character string 140 and the content update date and time data 142 acquired in S88 to the display panel 50.

In S92, as shown in FIG. 13(a), the CPU 14 displays a content title character string 162 on the display panel 50 based on the content title character string 140. The content title character string 162 is displayed in a scrolling ticker display so as to move from right to left in the display panel 50. That is, the content title character string 162 is displayed as a ticker. In addition to the content title character string 162, a Web site title character string and content update date and time may also be displayed on the display panel 50. After S92, the process advances to S100.

In S100, the CPU 14 waits for an event to be generated. If generation of any event is detected in S100, then the process advances to S102. In S102, the CPU 14 determines whether or not the event, generation of which was detected in S100, (hereinafter referred to as "generated event in S100") is a character string scroll end event. The character string scroll end event is a notification that the scrolling ticker display of the content title character string 162 for one item of content has ended.

Figure 6:
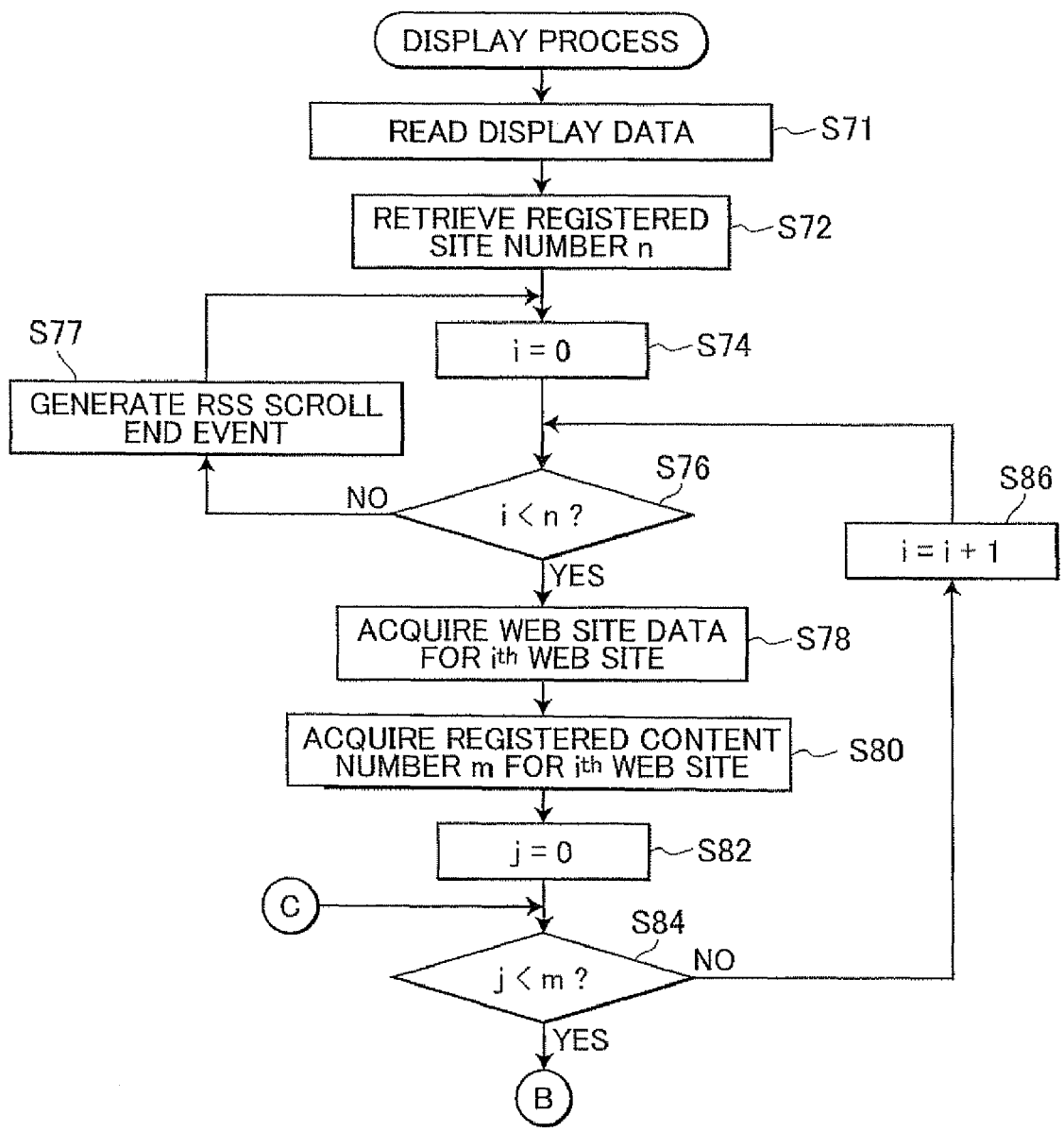
FIG. 6 is a flowchart representing part of a display process executed in the multifunction device.

If so (S102:YES), then in S104, the CPU 14 increments the value of the counter j by 1 and returns to S84 of FIG. 6. If a positive determination is made in S84 (S84:YES), then the processes in S88, S90, and S92 are repeated. As a result, a content title character string 162 is displayed as a ticker based on the next update content data 132 (for example, the first (j=1) update content data 132). After the content title character string 162 is displayed as a ticker based on all entries of update content data 132 for a single Web site, a negative determination is made in S84 (S34:NO). In this case, the CPU 14 advances to S86 where the CPU 14 increments the value of the counter i by 1, and repeats the process in S78 to S92 for the next Web site (first (i=1) Web site, for example). As a result, the content title character string 162 is displayed as a ticker based on the update content data 132 of the next Web site.

If a negative determination is made in S76 of FIG. 6 (S76: NO), then in S77, the CPU 14 generates a RSS scroll end event and then returns to S74. The RSS scroll end event is a notification that all m items of content included in the n registered Web sites have been completely displayed in the scrolling ticker display. In other words, the RSS scroll end event is generated upon completion of the scrolling ticker display.

Figure 7:
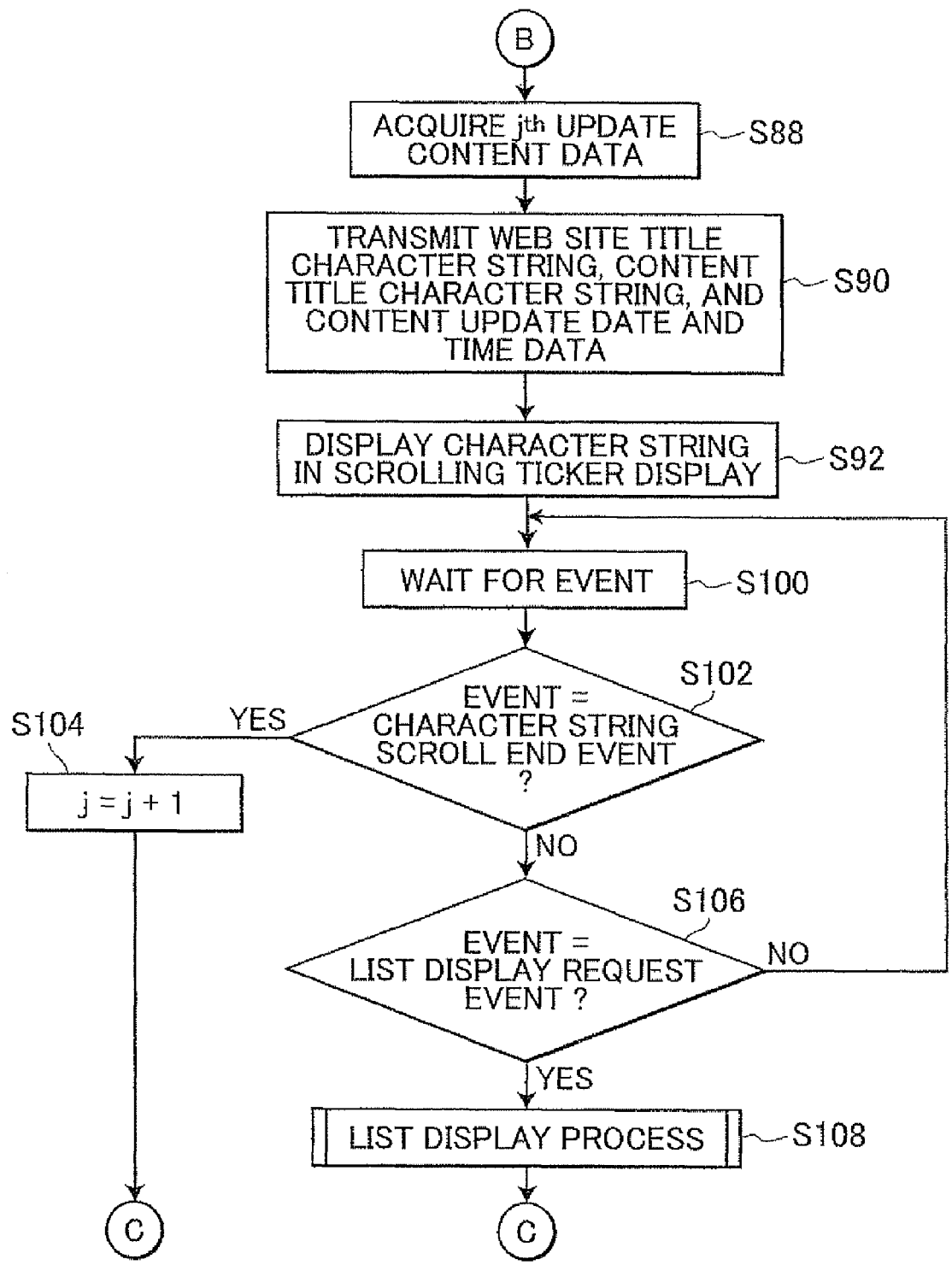
FIG. 7 is a flowchart representing remaining of the display process.

If it is determined in S102 of FIG. 7 that the generated event in S100 is not the character string scroll end event (S102:NO), then the process advances to S106. In S106, the CPU 14 determines whether or not the generated event in S100 is a list display request event. The list display request event is a notification that the user has selected the content title character string 162 displayed as a ticker as shown in FIG. 13(a) by pressing a key of the keypad 52. In this way, the user can select a content corresponding to the content title character string 162.

If it is determined in S106 that the generated event in S100 is not the list display request event (S106:NO), then the process returns to S100. On the other hand, if so (S106:YES), then the CPU 14 executes a list display process in S108.

Figure 8:
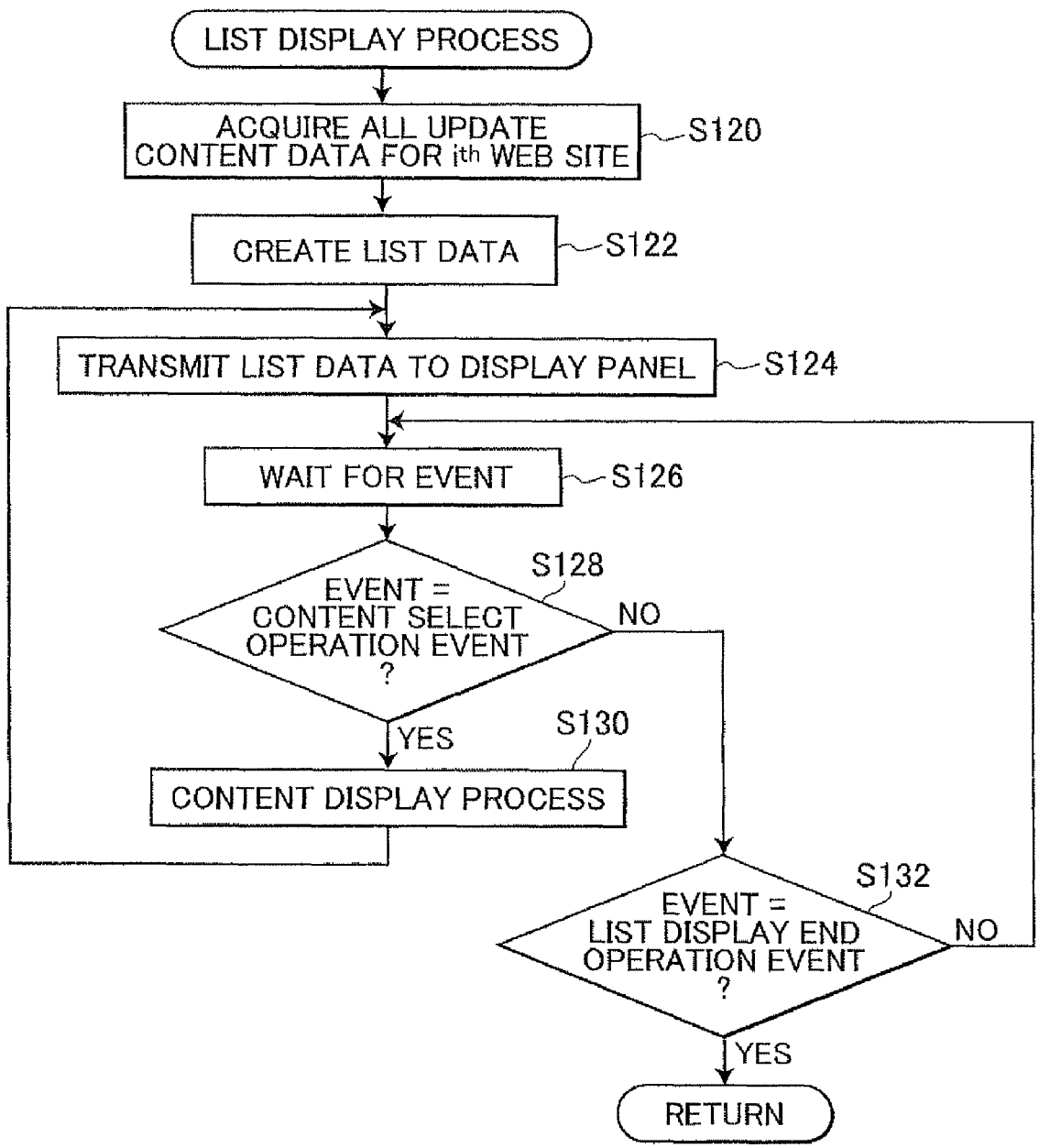
FIG. 8 is a flowchart representing a list display process executed in the multifunction device.

The list display process executed in S108 will be described with reference to the flowchart shown in FIG. 8. In the list display process, first in S120, the CPU 14 acquires all entries of update content data 132 for the $i^{th}$ Web site (the content title character string 162 of which was selected by the user) from the display data storage area 36 of the RAM 30.

Because there are m entries of update content data 132 for the $0^{th}$ Web site in the example of FIG. 4, the CPU 14 acquires m update content data 132 entries in S120 in this case. In S122, the CPU 14 creates list data including the Web site title character string 122 acquired in S78 and the content title character string 140 and the content update date and time data 142 acquired in S120. Then, in S124, the CPU 14 transmits the list data generated in S122 to the display panel 50. As a result, as shown in FIG. 13 (b), a list 170 is displayed on the display panel 50.

The list 170 includes a content update date and time 161 and the content title character string 162 for each of the plurality of content items (m content items, for example). Thus, the content update date and time 161 "20:23" and the content title character string 162 "Prime Minister to Step Down . . . " are displayed on the display panel 50 in the top row of the list 170 based on politics-related content in this example. A web site title character string 172 "ABC.COM" is also displayed in this example.

In S126, the CPU 14 waits for an event to be generated. If generation of any event is detected in S126, then in S128 the CPU 14 determines whether or not the event, generation of which was detected in S126, (hereinafter referred to as "generated event in S126") is a content select operation event. The content select operation event is an event that is generated when the user selects (touches) one of the plurality of content title character strings 162 in the list 170 displayed on the display panel 50 (FIG. 13(b)). If a positive determination is made in S128 (S128:YES), then in S130, the CPU 14 executes a content display process. In the content display process, the web site title character string 122, the content update date and time data 142, the content title character string 140, and the content summary character string 144 corresponding to the selected content title character string 162 are transmitted to and displayed on the display panel 50 as summary display data. By selecting a desired content title character string 162 in the list 170 in this way, the user can select a desired content and make the display panel 50 to display the summary display data for the selected content.

The content display process is not limited to a process for displaying the summary display data on the display panel 50, but may be a process to acquire the selected content from the Web site of the server 90, 91 based on the content URL 146 corresponding to the selected content title character string 162 and display the same on the display panel 50. Alternatively, the content display process may be a process to transmit the content URL 146 for the selected content to the PC 70 or 71 via the network interface 60. In this case, the selected content may be acquired from the server 90, 91 and displayed for the user on the PC 70 or 71, which has a display unit larger than the display panel 50 of the multifunction device 10. Further, a television or other device having a display function may be used in place of the PCs 70 and 71 to display the content.

If it is determined in S128 that the generated event in S126 is not the content select operation event (S128:NO), then in S132, the CPU 14 determines whether or not the generated event in S126 is a list display end operation event. The list display end operation event is generated when the user selects (touches) a Close button 174 (FIG. 13(b)) while the list 170 is displayed on the display panel 50.

If a positive determination is made in S132 (S132:YES), then the CPU 14 ends the list display process and returns to S84 of FIG. 6. On the other hand, if a negative determination is made in S132 (S132:NO), then the CPU 14 returns to S126.

The multifunction device 10 (display panel 50) has a sleep mode and an active mode. In the sleep mode, a backlight of the display panel 50 is extinguished so that data displayed on the display panel 50 cannot be seen. However, feeds continue to be periodically acquired and the display data 112 continue to be periodically updated even in the sleep mode. In the active mode, applications are either running or idle, while the backlight of the display panel 50 is lit so that various data displayed on the display panel 50 can be viewed.

The sleep mode process executed by the CPU 14 of the multifunction device 10 will be described with reference to the flowcharts in FIGS. 9 and 10. The sleep mode process is executed to selectively start and cancel the sleep mode. When the multifunction device 10 is started, the CPU 14 executes the sleep mode process as an independent task based on the sleep mode program 25 (FIG. 2).

In the sleep mode process, first in S402, a sleep timer is started. The sleep timer generates a sleep timer time up event when a predetermined time has elapsed since the start (reset) of the sleep timer. The predetermined time may be set to an arbitrary value. In S404 to S424 of FIG. 9, the CPU 14 performs a control process to cancel the sleep mode. On the other hand, in S430 to S436 of FIG. 10, the CPU 14 performs a control process to start the sleep mode.

First, the processes in S404 to S424 to cancel the sleep mode will be described. In S404, the CPU 14 refers to application flags each indicating an application status, which is an operating state of either of the printer unit 54, the scanner unit 56, the facsimile unit 58, and the like.

An example of an application status will be described for the printing process shown in FIG. 11, in which the CPU 14 issues a print command to the printer unit 54. The CPU 14 performs the printing process as an independent task.

Figure 11:
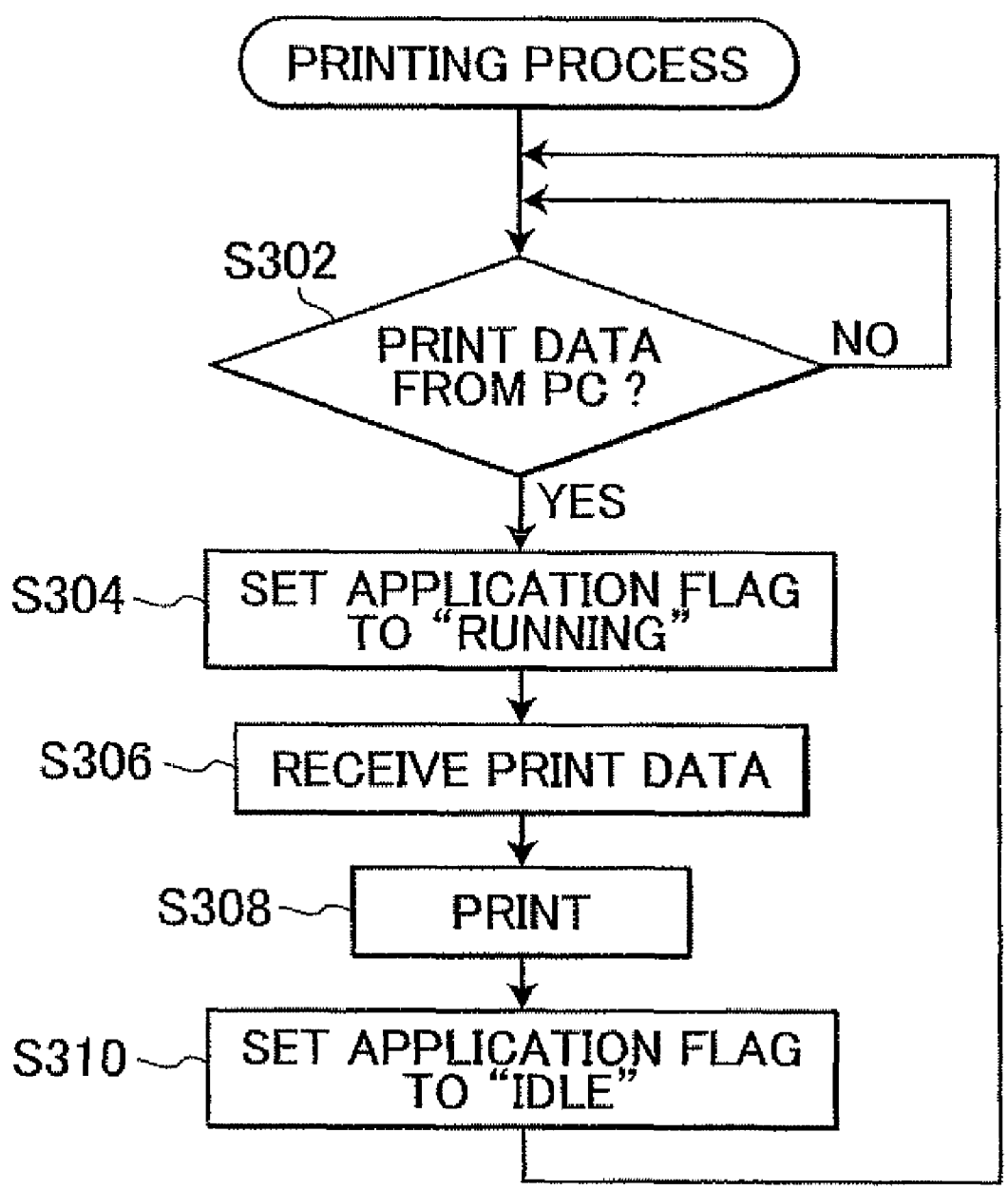
FIG. 11 is a flowchart representing a printing process executed in the multifunction device.

In S302 of FIG. 11, the CPU 14 determines whether or not there is input of print data from the PC 70 or 71 via the network interface 60. If not (S302:NO), then the process returns to S302. On the other hand, if so (S302:YES), then the process advances to S304. In S304, the CPU 14 sets a corresponding one of the application flags stored in the feed analysis work area 34 to "running". Then, in S306, the print data is received from the PC 70 or 71, and in S308, printing is performed in the printer unit 54. After the printing is completed, the process advances to S310. In S310, the CPU 14 sets the application flag to "idle" and subsequently returns to S302.

Figure 9:
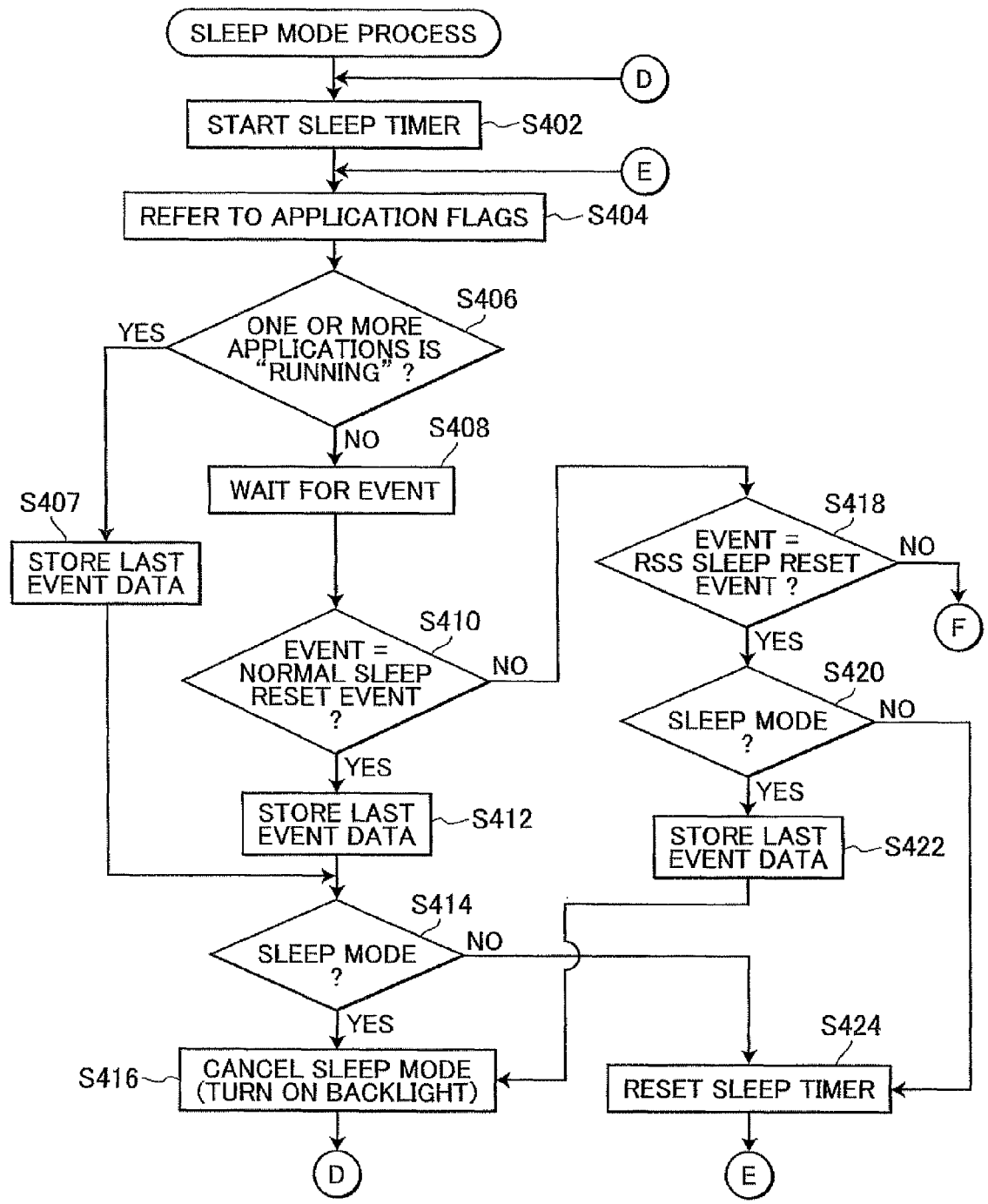
FIG. 9 is a flowchart representing part of a sleep mode process executed in the multifunction device.
Figure 10:
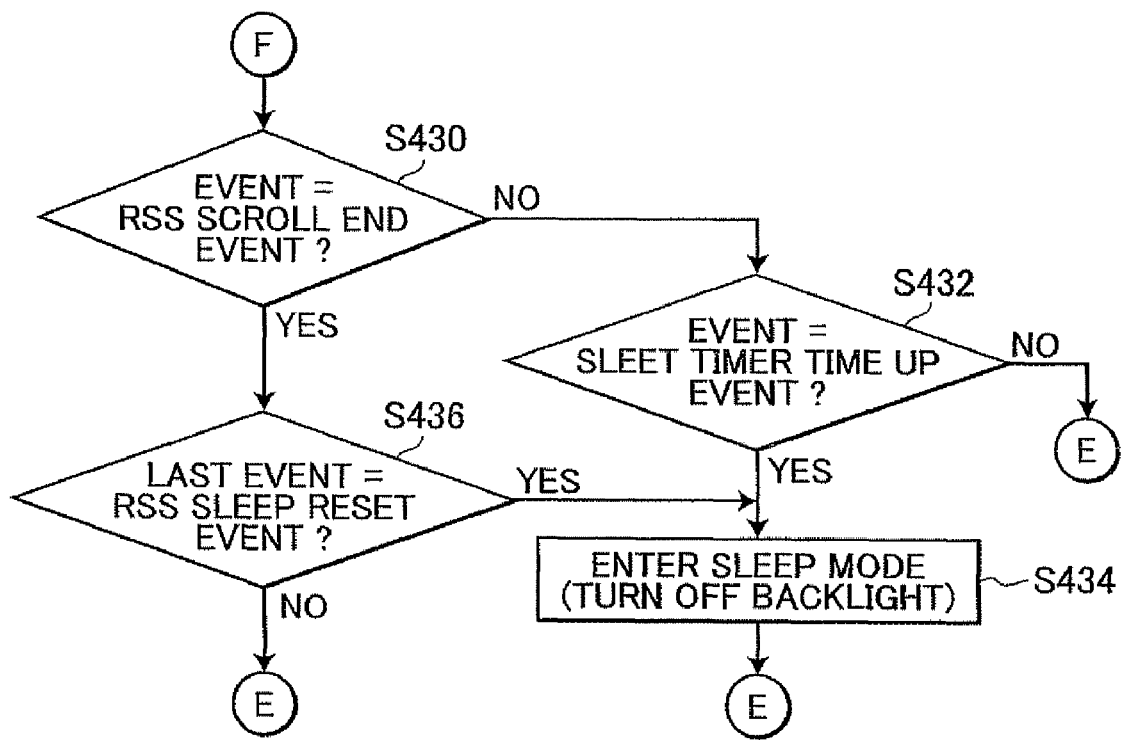
FIG. 10 is a flowchart representing remaining of the sleep mode process.

Consequently, in S404 of FIG. 9, the CPU 14 can detect whether the application status of the printer unit 54 is "running" ("active") or "idle." Processes for toggling the application flags for other applications related to the scanner unit 56, the facsimile unit 58, and the like are performed similar to the process shown in FIG. 11, but these processes will not be described here.

In S406 of FIG. 9, the CPU 14 determines whether the state of one or more applications is "running." If so (S406:YES), then in S407, the CPU 14 stores an application running event as last event data into the feed analysis work area 34, and the process advances to S414. On the other hand, if not (S406:NO), then the process advances to S408.

In S408, the CPU 14 waits for an event to be generated. If generation of any event is detected in S408, then the process advances to S410. In S410, the CPU 14 determines whether or not the event, generation of which was detected in S408, (hereinafter referred to as "generated event in S408") is a normal sleep reset event. The normal sleep reset event is generated in a normal sleep reset event generation process when the user performs a key input operation on the keypad 52 to generate the list display request event (S106 of FIG. 7), for example.

The normal sleep reset event generation process will be described with reference to the flowchart of FIG. 12. The CPU 14 executes the normal sleep reset event generation process as an independent task. In S322, the CPU 14 determines whether key input on the keypad 52 was received. If not (S322:NO), then the process returns to S322. On the other hand, if so (S322:YES), then in S324, the CPU 14 generates the normal sleep reset event. That is, the CPU 14 stores a flag for the normal sleep reset event in the feed analysis work area 34. Next, in S326, the CPU 14 processes the key input, and returns to S322.

If a negative determination is made in S410 of FIG. 9 (S410:NO), then in S418, the CPU 14 determines whether or not the generated event in S408 is the RSS sleep reset event. The RSS sleep reset event is generated in S58 of FIG. 5 for notifying update of feeds (display data 112) as described above. If a negative determination is made in S418 (S418:NO), then the process advances to S430 of FIG. 10. On the other hand, if a positive determination is made in S418 (S418:YES), then the process advances to S420.

In S420, the CPU 14 determines whether or not the multifunction device 10 is in the sleep mode. If so (S420:YES), then in S422, the CPU 14 stores the RSS sleep reset event as the last event data into the feed analysis work area 34. In S416, the CPU 14 cancels the sleep mode and turns ON the backlight. Then, the process returns to S402. On the other hand, if not (S420:NO), then in S424, the CPU 14 resets the sleep timer, and the process returns to S404.

Consequently, when the RSS sleep reset event is generated (when the feeds have been updated), the CPU 14 restores the display panel 50 from a sleep state to an active state. Therefore, when an updated feed is obtained at an update timing, the sleep mode is canceled to turn ON the backlight of the display panel 50, thereby notifying the user of obtaining of the updated feed.

On the other hand, if it is determined in S410 of FIG. 9 that the generated event in S408 is the normal sleep reset event (S410:YES), then in S412, the CPU 14 stores the normal sleep reset event as the last event data into the feed analysis work area 34.

Then, in S414, the CPU 14 determines whether or not the multifunction device 10 is in the sleep mode. If so (S414:YES), then the process advances to S416. On the other hand, if not (S414:NO), then the process advances to S424.

Next, the processes in S430 to S436 of FIG. 10 for entering the sleep mode will be described. In S430, the CPU 14 determines whether or not the generated event in S408 is the RSS scroll end event. The RSS scroll end event is generated in S77 of FIG. 6 upon completion of the scrolling ticker display as described above.

If a negative determination is made in S430 (S430:NO), then in S432, the CPU 14 determines whether or Dot the generated event in S408 is the sleep timer time up event. The sleep timer time up event is generated when the predetermined time duration has elapsed since the reset of the sleep timer as described above. If not (S432:NO), then the process returns to S404. On the other hand, it so (S432:YES), then the process advances to S434. In S434, the CPU 14 sets the multifunction device 10 into the sleep mode and turns OFF the backlight of the display panel 50.

If a positive determination is made in S430 (S430:YES), then in S436, the CPU 14 determines whether or not a last event is the RSS sleep reset event based on the last event data stored in the feed analysis work area 34. If not (S436:NO), then the process returns to S404. On the other hand, if so (S436:YES), then in S434, the CPU 14 sets the multifunction device 10 into the sleep mode.

Figure 5:
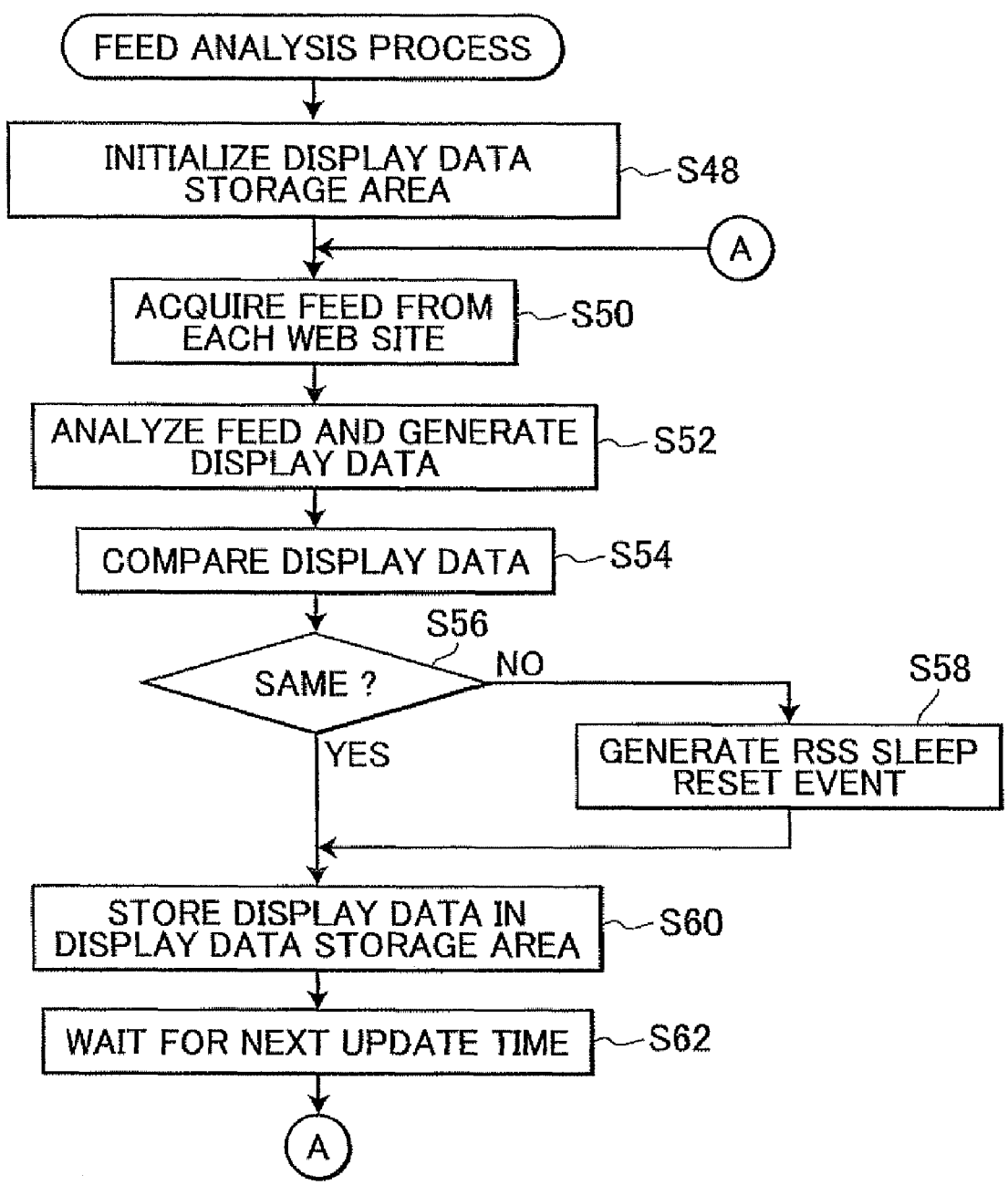
FIG. 5 is a flowchart representing a feed analysis process executed in the multifunction device.
Figure 12:
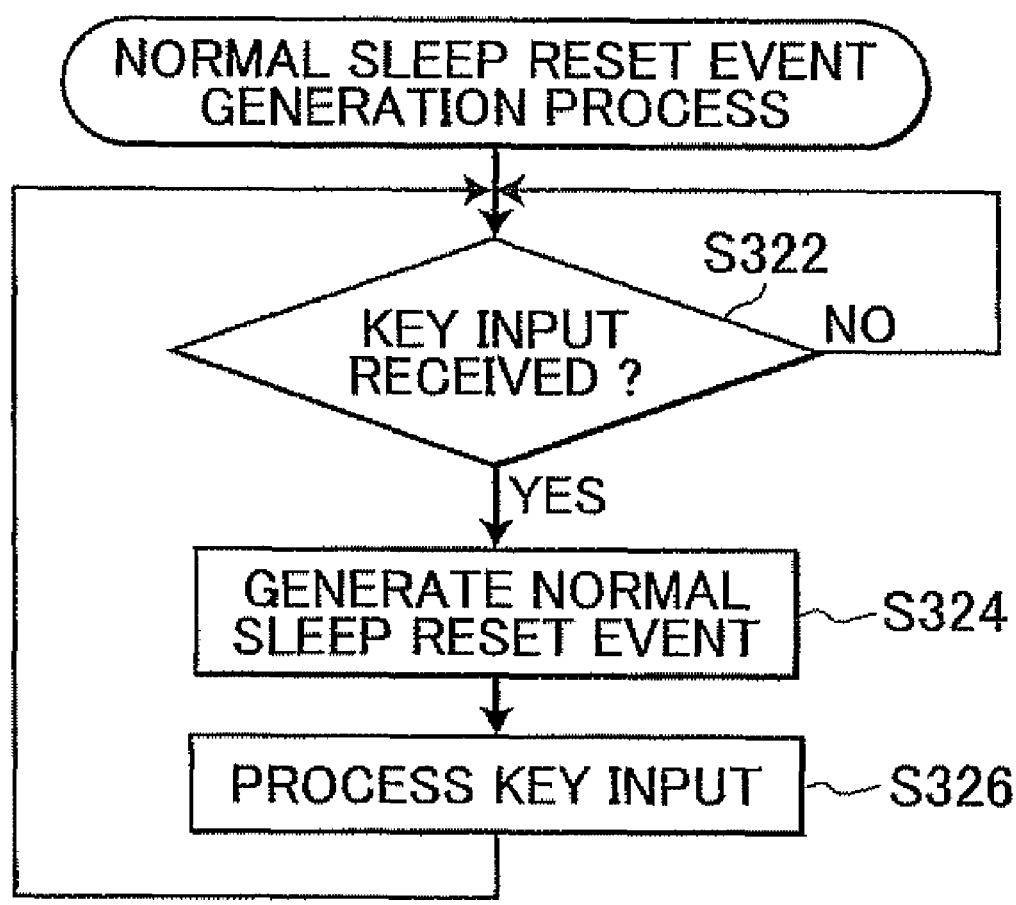
FIG. 12 is a flowchart representing a normal sleep reset event generation process executed in the multifunction device.

As described above, the multifunction device 10 enters the active mode when any application status changes to "running" (S304 of FIG. 11) or either the normal sleep reset event or the RSS sleep reset event is generated (S324 of FIG. 12 or S58 of FIG. 5).

On the other hand, the multifunction device 10 enters the sleep mode depending on both the last event data and the type of event generated. That is, when the multifunction device 10 is in the active mode due to the RSS sleep reset event (i.e., when last event is the RSS sleep reset event (S436:YES)), the CPU 14 shifts the multifunction device 10 into the sleep mode when the RSS scroll end event is generated (S430:YES) or when the sleep timer time up event is generated (S432:YES). This control is defined as the first control process.

However, when the last event is the application running event or the normal sleep reset event, the CPU 14 shifts the multifunction device 10 into the sleep mode when the sleep timer time up event is generated (S432:YES). In other words, even when the RSS scroll end event is generated, the CPU 14 does not shift the multifunction device 10 into the sleep mode if the last event is not the RSS sleep reset event (S436:NO). This control is defined as the second control process.

Thus, if the normal sleep reset event is generated while the CPU 14 is performing the fast control process, the last event data is changed from the RSS sleep reset event to the normal sleep reset event in S412, causing the CPU 14 to shift from the first control process to the second control process. If the application status becomes "running" while the CPU 14 is executing the first control process, the last event data is changed from the RSS sleep reset event to the application running event in S407, causing the CPU 14 to shift from the first control process to the second control process.

Hence, after the multifunction device 10 is shifted from the sleep mode to the active mode by the update of the feed (display data 112), the CPU 14 shifts from the first control process to the second control process if, for example, the user performs an operation (key input) to select the content title character string 162 or performs an operation to transmit a print command to the multifunction device 10 from the PC 70 or 71. Accordingly, the multifunction device 10 does not enter the sleep mode until the predetermined time duration elapses after the last operation, even after the scrolling ticker display is completed.

In other words, the multifunction device 10 does not enter the sleep mode upon completing the scrolling ticker display if the user selects the content title character string 162 displayed on the display panel 50, thereby avoiding a case in which the user can no longer view the display on the display panel 50, regardless of whether the user has performed a key operation. Further, by selectively using the first control process and the second control process when appropriate, the multifunction device 10 can effectively save power.

If the scrolling ticker display is completed before the sleep tinier time up event is generated, then the CPU 14 shifts from the active mode to the sleep mode upon completion of the scrolling ticker display. Hence, it is possible to minimize the period in which the multifunction device 10 is in the active mode, based on the data amount of feeds.

While the invention has been described in detail with reference to the embodiment thereof, it would be apparent to those skilled in the art that various changes and modifications may be made therein without departing from the spirit of the invention.

For example, in the above embodiment, when the user selects the content title character string 162 displayed as a ticker as shown in FIG. 13(a), then the list display process is executed in S108 of FIG. 7 so that the list 170 is displayed on the display panel 50 as shown in FIG. 13(b). However, the content display process (S130 of FIG. 8) may be executed in S108 instead. In this case, when the user selects the content title character string 162 displayed as a ticker, then the summary display data (the content summary character string and the like) of the selected content is displayed on the display panel 50. Alternatively, the content corresponding to the selected content title character string 162 may be acquired from the server 90, 91 and displayed on the display panel 50.

Also in the above embodiment, the backlight of the display panel 50 is turned OFF when the multifunction device 10 enters the sleep mode. However, a screen saver may be displayed in the sleep mode without turning OFF the backlight.

Further, in the above-described embodiment, it is determined whether or not the feeds are updated by comparing the previously generated display data 112 to the currently generated display data 112. However, it may be determined whether or not the feeds are updated by comparing the previously acquired feeds to the currently acquired feeds.

What is claimed is:

1. A communication device communicable with a server that distributes a plurality of content items and a content feed including a plurality of titles of the respective content items, comprising:
 a display section;
 a content feed acquiring unit configured to acquire the content feed from the server each time a first predetermined time duration elapses;
 a first display unit configured to control the display section to sequentially display the plurality of titles of the content items;
 a first control unit configured to shift the display section from a sleep mode to an active mode when a first event is generated while the display section is in the sleep mode, the first event being reception of an updated content feed by the content feed acquiring unit; and
 a second control unit configured to shift the display section from the sleep mode to the active mode when a second event different from the first event is generated in the sleep mode, the second control unit shifting the display section from the active mode to the sleep mode when the second predetermined time duration has elapsed without any event being generated in the active mode,
 wherein the first control unit shifts the display section from the active mode to the sleep mode either when sequential display of the plurality of titles is completed or when a second predetermined time duration has elapsed without any event being generated in the active mode,
 wherein when a last event is an application running event or a normal sleep reset event, the second control unit shifts the display section into the sleep mode when the sleep timer time up event is generated.

2. The communication device according to claim 1, further comprising:
 a selecting unit configured to select either of the first control unit and the second control unit, the selecting unit selecting the second control unit when the second event is generated.

3. The communication device according to claim 2, further comprising:
 a first select receiving unit configured to receive a selection for one of the titles sequentially displayed on the display section by the first display unit;
 a second display unit configured to control the display section to display a list of the titles when the first select receiving unit receives the selection; and
 a second select receiving unit configured to receive a selection for one of the titles in the list, wherein:
 the content feed further includes a plurality of entries of content data that include the respective title; and
 the second event is the reception of the selection by the first select receiving unit.

4. The communication device according to claim 3, further comprising a content acquiring unit and a third display unit, wherein:
 the content acquiring unit acquires the content item based corresponding to the selected one of the titles in the list; and
 the third display unit controls the display section to display the content item acquired by the content acquiring unit.

5. The communication device according to claim 3, further comprising a communication unit and a transmitting unit, wherein:
 the communication unit is communicable with an information display device;
 each of the entries of content data includes location data indicating a location of a corresponding one of the content items; and
 the transmitting unit transmits the location data corresponding to the selected one of the titles in the list to the information display device via the communication unit.

6. The communication device according to claim 3, wherein the second display unit controls the display section to display the list of the titles that are included in the same content summary as the selected one of the titles sequentially displayed on the display section.

7. The communication device according to claim 2, further comprising an operation unit configured to accept various inputs, wherein the second event is an operation of the operation unit.

8. The communication device according to claim 2, further comprising a communication unit configured to communicate with an information display device, wherein the second event is reception of a signal from the information display device via the communication unit.

9. The communication device according to claim 2, further comprising:
 a first select receiving unit configured to receive a selection for one of the titles sequentially displayed on the display section;
 a content acquiring unit configured to acquire the content item corresponding to the selected one of the titles; and
 a third display unit configured to control the display section to display the content item acquired by the content acquiring unit, wherein:
 the content feed further includes a plurality of entries of location data each indicating a location of a corresponding one of the content items;
 the content acquiring unit acquires the content item based on the location data; and
 the second event is the reception of the selection by the first select receiving unit.

10. The communication device according to claim 2, wherein the selecting unit selects the first control unit when the first event is generated.

11. The communication device according to claim 1, further comprising an update detecting unit configured to detect update of the content feed by comparing a previously acquired content feed with a currently acquired content feed.

12. The communication device according to claim 2, wherein the second event is one of an application running event and a normal reset event.

13. The communication device according to claim 1, wherein when the communication device is in the active mode due to a last event being a content feed sleep reset event, the first control unit shifts the display section into the sleep mode when the sequential display is completed or when a sleep timer time up event is generated.

14. The communication device according to claim 1, wherein when the sequential display is completed, the second control unit does not shift the display section into the sleep mode if the last event is not the content feed sleep reset event.

* * * * *